Oct. 16, 1923.

A. HAWORTH 1,470,732

APPARATUS FOR TREATING FRUIT AND THE LIKE

Filed May 11, 1922      2 Sheets-Sheet 2

Inventor
Albert Haworth,
By Steward & McKay
his Attorney

Witness:—
Chas. L. Griesbauer

Patented Oct. 16, 1923.

1,470,732

UNITED STATES PATENT OFFICE.

ALBERT HAWORTH, OF WINTERHAVEN, FLORIDA, ASSIGNOR TO BROGDEX COMPANY, OF WINTERHAVEN, FLORIDA, A CORPORATION OF FLORIDA.

APPARATUS FOR TREATING FRUIT AND THE LIKE.

Application filed May 11, 1922. Serial No. 560,141.

*To all whom it may concern:*

Be it known that I, ALBERT HAWORTH, a citizen of the United States, residing at Winterhaven, county of Polk, and State of Florida, have invented certain new and useful Improvements in Apparatus for Treating Fruit and the like; and I do hereby declare the following to be a full, clear, and exact description of the invention, such as will enable others skilled in the art to which it appertains to make and use the same.

This invention relates to apparatus for treating fruit and the like; and it relates more particularly to apparatus for applying a protective coating composition to fruit, and especially citrous fruit such as oranges, tangerines, grapefruit and lemons, effective, when properly applied, to preserve the fruit for a long time in its original fresh, sound and plump condition.

Compositions comprising a waxy material, such as paraffin, in mixture with a liquid vehicle, such as a petroleum distillate have been found suitable for use in the treatment of fruit by the novel apparatus. Mixtures of paraffin and gasoline, for example, have given satisfactory results; but these are referred to here merely by way of examples of coating compositions which may be used in the novel apparatus and without intending to limit its use thereto.

In the treatment of fruit with protective coating compositions, some form of brushing or rubbing means are generally employed to evenly distribute the composition in a thin, uniform and smooth coating over the surface of the fruit. The proper quantities of the composition for such distribution are initially applied either directly to the fruit, and the fruit thereafter fed to the brushing or rubbing means, or directly to the latter, which then both initially applies the composition to the fruit and distributes the same as a coating over the surface. In my novel apparatus such brushing or rubbing means are employed, and the mechanically operating means provided for supplying the proper quantities of the composition, apply the same directly to the brushing or rubbing means. Such an arrangement of operating parts is particularly effective in the treatment of the fruit, for it has been found that excellent results are attained by brushing or rubbing the composition over the fruit immediately after the initial application of the required quantity to its surface. Such excellent results are also particularly apparent where the main body of the coating composition is maintained with its constituent ingredients uniform in proportions and consistency throughout the mass, as the direct delivery of the composition therefrom to the brushes and the immediate brushing of the composition over the fruit does not allow time for separation or "clumping" to occur. In my novel apparatus therefore an agitating or mixing device to maintain the composition in homogeneous condition may desirably be employed.

It is highly important for the effective and economical treatment of the fruit that only that precise quantity of the composition be supplied thereto, or initially to the brushing means, which is sufficient without waste or excess to be formed into the thin uniform coating referred to. That precise quantity required may vary, however, in accordance with the quantity or size of the fruit being treated as well as in accordance with variations in the character and proportions of the constituents of the composition. Accordingly, an object of my invention is the provision of means, manually operable at will, to vary by a fine adjustment the quantity of the coating material delivered from the available supply for application to the fruit.

In one of its broad aspects, the novel apparatus comprises an assembly in association with the brushing mechanism, of a container for the available supply of the coating composition, and a traveling composition-applying means having an adjustably variable path of travel relative to the brushing mechanism and the container for taking from the available supply and applying to the brushing mechanism the precise quantities of the composition required for forming the coating over the fruit. Desirably also, the container for the available supply is mounted for independent adjustment relative to the applying-means and the brushing mechanism, such adjustment serving to not only vary the effective path of travel of the applying means in the container but to permit advancing the container to positions rendering possible the utilization of a greater portion of its contents.

The invention will be best understood from the description hereinafter given of a typical concrete embodiment thereof exemplified in the apparatus shown in the accompanying drawings forming a part hereof. It is to be understood, however, that the typical embodiment hereinafter described is merely illustrative and that within the broad scope of the invention are included other specific constructions capable of functioning in accordance with the principles here involved.

Referring to the drawings.

Figure 1:
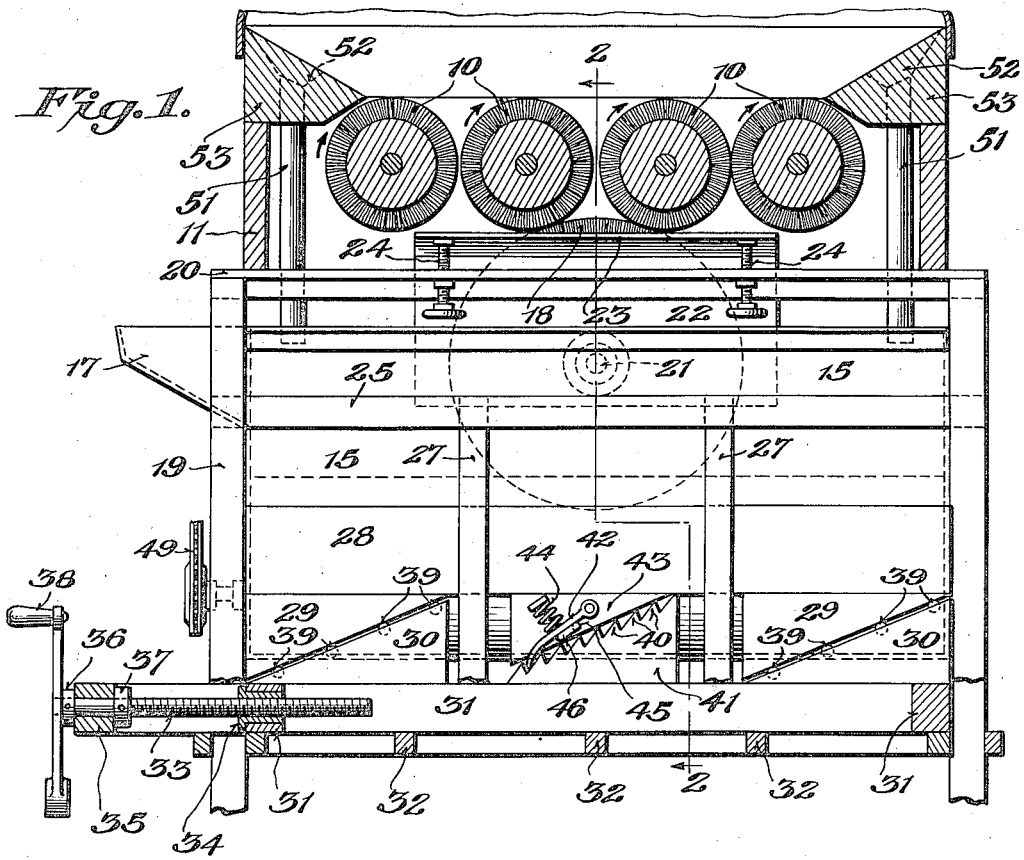
Fig. 1 is a partial transverse section and a partial end elevation of apparatus constructed in accordance with my invention.

In the construction chosen to illustrate the principles of the invention, the rubbing or brushing mechanism is of the inclined parallel brush-roll type of which the well-known Stebler-Parker polisher is a typical example. In the present instance, the inclined parallel brush rolls of this type of polisher are indicated generally at 10. These rotary brush rolls may be of the usual type in which the rubbing or brushing surfaces are constituted by horse-hair bristles. A plurality of such rolls may be provided, four being shown by way of example mounted in the framework 11, cooperating in pairs to provide between each pair a runway for fruit, and the rolls inclined to provide a gentle slope of such runways from the upper or receiving end of the polisher to the lower or discharge end. These brush rolls are suitably journaled at their ends in the framework 11, and are driven at the proper speed in the same direction of rotation by any suitable driving mechanism, such for example as a common drive shaft extending transversely of the ends of the brush roll spindles and with bevel gears thereon cooperating with bevel gears on the brush-roll spindles. Such a driving mechanism is partially shown in Fig. 2, the common drive shaft being indicated by the numeral 12 and one pair of cooperating bevel gears by the numerals 13 and 14.

Below the polisher rolls and adjacent the upper or receiving ends thereof is mounted a tank or reservoir 15, holding the fluid or semi-fluid coating and preserving composition 16, which is to be applied to the fruit or the like and to be rubbed over the surface thereof to form the preservative coating hereinbefore referred to. The tank 15 is provided at one end thereof with a hopper 17 through which the coating composition may be supplied to the tank as may be necessary.

In the illustrative apparatus the means for transferring the coating material from the supply tank to the polisher rolls 10, comprises an applying roll, preferably in the form of a short brush roll indicated at 18, mounted to depend into the supply tank in position to take therefrom supplies of the coating material and to peripherally and frictionally engage the polisher rolls to deliver or apply thereto the coating material thus taken up. As many applying rolls as there are polisher rolls may be employed if desired, one engaging each polisher roll. Or, one applying roll for each pair of polisher rolls may be employed, engaging either one only or both polisher rolls of the pair, the last mentioned engagement made possible, it is to be observed, because the polisher rolls are all rotated in the same angular direction. In the illustrative apparatus, a series of four polisher rolls are employed and with one applying roll engaging the two inner polisher rolls of the series.

As these two inner polisher rolls cooperate with one another and with the two outer rolls of the series to form the runways which the fruit traverses, the application of the coating material initially to these two inner polisher rolls is sufficient for a distribution of that material over the fruit traversing any of the runways.

The applying roll 18 is mounted to frictionally engage the polisher rolls in such manner as to be rotated thereby and by such rotation to continuously transfer coating material from the supply tank and apply the same to the polisher rolls. It is apparent that the amount of coating material thus transferred and applied depends in part upon the extent of the peripheral path of travel of the applying roll in the coating material in the supply tank and in part upon the degree of the engaging pressure of the applying roll upon the polisher roll. It is therefore also apparent that the application of the coating material can be regulated by adustably varying either the extent of dependence of the applying roll into the supply tank or the engaging pressure of that roll upon the polisher rolls, or both. In the construction here illustrated, this adjustability is attained by independently mounting the supply tank and the applying roll, and in such manner that each is adjustable relative to the other and relative to the polisher rolls. As the parts are arranged in the illustrative example, this adjustability is in a vertical direction, and such adjustability, particularly of the supply tank vertically toward the applying roll and polisher rolls, also enables utilizing successively lower fluid levels of the coating material in the tank without the necessity of maintaining a constant level by constantly replenishing the supply in the tank.

Various means for adjusting the supply tank and applying roll may be employed.

In the specific example here given, a screw-adjusted mounting is provided for the applying roll and an inclined plane or wedge and screw mechanism cooperating therewith for the adjustment of the supply tank. A framework, comprising uprights 19 and cross supports 20, is provided for mounting the applying roll. The spindle 21 of the applying roll is journaled at its opposite ends in side plates 22 having outwardly extending flanges 23 supported upon the adjusting screws 24 extending through the supports 20. With the arrangement shown, the plates 22 in which the applying roll is journaled depend freely from their supported position upon the adjusting screws 24 into the supply tank 15 and with an easy sliding fit against the side walls of the tank. In the specific example given, four adjusting screws 24 are shown, mounted to bear against the under surfaces of the flanges 23 of the two plates in which the applying roll is mounted, with an adjusting screw adjacent and supporting each end of each of the flanges. Such an arrangement permits of a fine adjustment of the applying rolls toward and away from the polisher rolls to vary the engaging pressure between them.

Figure 2:
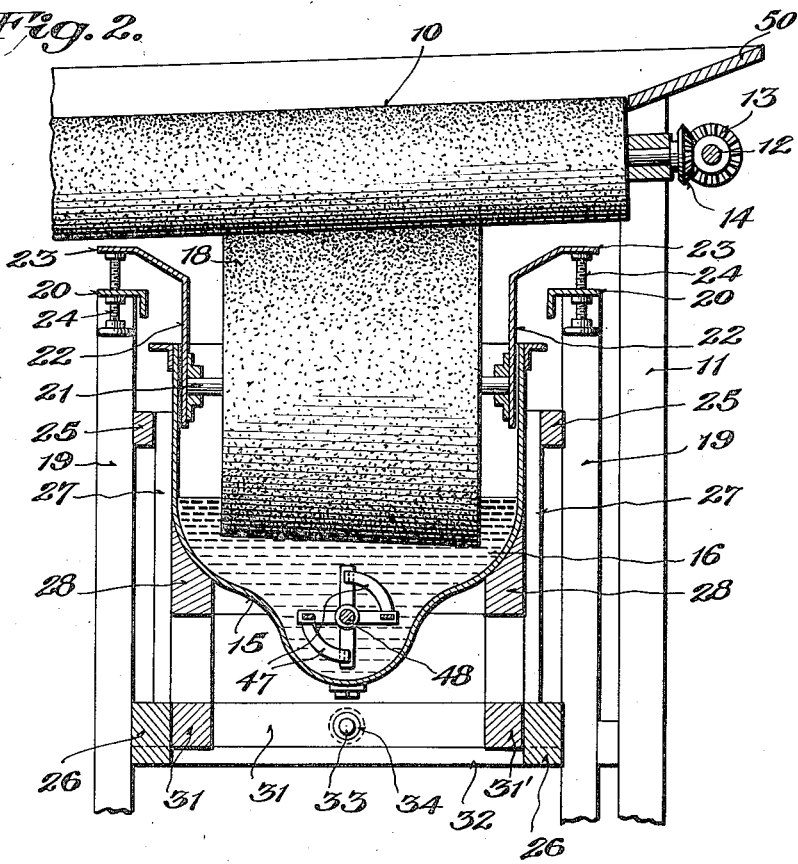
Fig. 2 is a partial longitudinal section thereof on the line 2—2 of Fig. 1 looking in the direction of the arrow.

Disposed inwardly of the framework adjustably mounting the applying roll is the framework adjustably mounting the supply tank. Cross members 25 and 26 are attached to the uprights 19 to form the outer upper and lower supports of the last mentioned framework. Within the framework provided by the uprights 19 and the cross members 25 and 26, are mounted vertically disposed members 27 spaced apart longitudinally of the tank as shown in Fig. 1 and on opposite sides thereof as shown in Fig. 2, to provide guides or slideways for the vertical movement of the tank. The tank is provided with a downwardly curved or channeled bottom of less width than the body portion thereof into which the applying roll depends, for a purpose later to be set forth. Affixed on each side to the inwardly curved bottom portion of the tank adjacent its vertical side walls is a cross-member 28 having an upper edge portion of the contour of the tank bottom and a side wall in sliding engagement with the slide-ways 27. Attached to the lower or bottom edge of each cross-member 28 are blocks 29 having inclined lower faces adapted to cooperate with blocks 30 having complementary inclined faces and independently mounted in a rectangular framework 31 horizontally reciprocable transversely of the apparatus.

Two opposite side portions of the framework 31 slidingly engage the cross members 26 affixed to the uprights 19, as shown in Fig. 2, and the bottom of the framework 31 is supported by and is adapted to slide over stationary cross members 32 extending between the members 26. The reciprocatory movement of the rectangular framework 31 to raise or lower the tank 15 may be effected, for example, by means of a screw 33 working in a threaded bushing 34 in a cross member of the frame 31 as shown in Fig. 1, said screw being rotatable in a stationary member 35 rigid with the machine framework, and the screw being held against longitudinal movement by stop collars 36 and 37. A crank 38 is provided for manual operation of the screw to move the frame 31 in either direction.

It is clear from the arrangement of the parts as viewed in Fig. 1, that a bodily movement of the frame 31 to the right moves the blocks 30 with respect to the blocks 29 in a direction lowering the tank 15 and that a bodily movement of the frame 31 to the left causes an elevation of the tank. In these movements, the two sets of blocks 29 and 30 may be considered as cooperating wedges advancing in wedging action to elevate and retreating to lower the tank, or one of the cooperating blocks may be considered as the inclined plane and the other as the raising and lowering element relatively moving along that plane. To reduce friction between the cooperating faces of the blocks roller bearings 39 are provided in one block to extend slightly beyond its inclined face into engagement with the complementary inclined face of the cooperating block.

To prevent an unintended relative movement of the cooperating blocks and hence an unintended raising or lowering of the supply tank, which movement might occur, for example, by an accidental turning of the crank 38 or by vibration of the apparatus, means for positively but releasably maintaining the tank in adjusted position is preferably employed. In the illustrative example, such means takes the form of a ratchet and pawl device, the ratchet, indicated at 40, mounted upon the inclined face of a block 41, conveniently located intermediate the end blocks 30, and the pawl, indicated at 42, pivoted to a block 43 having a complementary inclined face. A spring 44 releasably maintains the tooth of the pawl in engagement with the ratchet. Desirably, two blocks 41 and 43, each with a ratchet and pawl, are employed one on each side of the apparatus. Any suitable means may be employed for lifting the pawl away from the ratchet and for maintaining it in such released position when adjustment of the tank is to be made. In the illustrative apparatus, the means employed comprises a rocker-rod 45 designed to extend transversely through the blocks 43 to a position for its manual operation, this rocker-rod having fingers 46, one for each pawl, disposed beneath the pawl in such position that a rocking of the rod 45 in one direction moves the pawls 42 away from the ratchet 40 against the tension of the springs 44.

The blocks 41 and 43 may, if desired, be duplicates of the blocks 29 and 30 and with their inclined faces cooperating in the same way as adjusting elements, this being rendered possible by mounting the ratchet and pawl on the sides of these blocks. In the illustrative apparatus, however, the blocks 41 and 43 serve only as parts of the ratchet and pawl device referred to.

As hereinbefore stated, it is desirable to maintain the coating composition in the supply tank in a thoroughly mixed condition. In the illustrative apparatus a suitable agitating or stirring means for this purpose is employed, comprising a pair of helical blades 47 mounted on a shaft 48 in the depending portion or channel in the bottom of the tank, driven in any suitable manner, as through a chain and sprocket mechanism indicated generally at 49.

Drain pipes 51 of comparatively large capacity and having funnel-shaped mouths 52 in the side members 53 of the framework 11 adjacent the opposite sides of the series of polisher rolls, are preferably provided, to return to the supply tank 15 any particles or portions of the fluid or semi-fluid coating material thrown off by the polisher rolls.

In using the apparatus for coating fruit, the fruit is fed to the upper end of the machine over the chute board 50 and passes gradually down the sloping runways formed by the cooperating pairs of inclined parallel polisher rolls, the rate at which the fruit travels down the runways being dependent upon the rate at which said rolls are rotated. At the same time the applying roll 18 is also rotated by frictional engagement with those polisher rolls 10 with which it cooperates, the coating composition 16 being thus transferred by the roll 18 from the supply tank 15 to the rolls 10 at or adjacent their upper or receiving ends, and thence to the fruit just as it enters the runways between the polisher rolls. In this way, each fruit has a small quantity of the coating composition initially applied to it, and as the fruit progresses down the polisher runways, the composition is uniformly spread in a very thin coating or film all over the surface of the fruit by the rubbing action of the brush rolls.

While a specific embodiment of the novel apparatus has been referred to and described and while a specific example of its use in the treatment of fruit has been given, it is to be understood that the specific embodiment and example of use are merely illustrative of the principles of the invention. In regard to the usefulness of the apparatus, it is also to be understood that reference herein to fruit is to be construed broadly as including not only fruit strictly but also such vegetables as can be advantageously treated in the apparatus.

What I claim is:

1. Fruit treating apparatus comprising the combination, with fruit-brushing means, of a supply reservoir for coating material, traveling applying-means having a path of travel extending into said reservoir to receive therefrom a supply of the coating material and into cooperative relation with said brushing means to deliver coating material thereto, and means for varying the path of travel of said applying-means relative to said reservoir and relative to said brushing means in directions to vary the quantity of said coating material delivered to said brushing means.

2. Fruit treating apparatus comprising the combination, with fruit brushing means, of a supply reservoir for coating material, a traveling applying-means having a path of travel extending into said reservoir to receive a supply of the coating material and into cooperative relation with said brushing means to deliver coating material directly to said brushing means, and means for varying the path of travel of said applying-means within said reservoir in directions to vary the quantity of said coating material received by said applying means.

3. Fruit treating apparatus comprising the combination, with fruit brushing means, of a container for coating material, traveling applying-means having a path of travel extending into said container to receive therefrom a supply of the coating material and into cooperative relation with said brushing means to deliver coating material thereto, and means for bodily adjusting the position of said container to vary the extent of the path of travel of said applying means therein.

4. Fruit treating apparatus comprising the combination, with brush roll mechanism and means for feeding fruit thereto, of a container for coating material, applying-roll mechanism having a peripheral path of travel extending into said container and into engagement with said brush roll mechanism to transfer coating material from said container to said brush roll mechanism, and means for adjusting said applying-roll mechanism to vary the extent of its peripheral path of travel in said container.

5. Fruit treating apparatus comprising the combination, with brush roll mechanism and means for feeding fruit thereto, of a container for coating material, applying-roll mechanism having a peripheral path of travel extending into said container and into engagement with said brush roll mechanism to transfer coating material from said container to said brush roll mechanism, means including a screw adjustment for variably positioning said applying-roll mechanism to vary the extent of its peripheral path of travel in said container.

6. An apparatus for treating fruit comprising the combination, with brush roll mechanism and means for feeding fruit thereto, of a container for coating material adjustably mounted therebelow, applying roll means extending into said container and engaging said brush roll mechanism, and means for adjusting said container toward and from said applying-roll means.

7. An apparatus for treating fruit comprising the combination, with brush roll mechanism and means for feeding fruit thereto, of a container for coating material adjustably mounted therebelow, applying roll means extending into said container and engaging said brush roll mechanism, means for adjusting said container vertically toward and from said applying roll means and a ratchet and pawl device for releasably maintaining said container in adjusted position.

8. Fruit treating apparatus comprising the combination, with brush roll mechanism and means for feeding fruit thereto, of a container for a coating material adjustably mounted therebelow, applying roll means adjustably mounted independently of said container and depending therein and engaging said brush roll mechanism to transfer thereto coating material from said container, and means comprising a screw adjustment for varying the engaging pressure of said applying roll means upon said brush roll mechanism.

9. Fruit treating apparatus comprising the combination, with brush roll mechanism and means for feeding fruit thereto, of a container for a coating material, an applying roll depending into said container and engaging said brush roll mechanism to transfer thereto coating material from said container, and means adapted to adjustably vary the cooperative relation of said parts consisting of said applying roll and said container to adjustably vary the extent that said applying roll depends into said container, and means to releasably maintain an adjusted part in its adjusted position.

10. Fruit treating apparatus comprising the combination, with brush roll mechanism and means for feeding fruit thereto, of a container for a coating material, an applying roll depending into said container and engaging said brush roll mechanism to transfer thereto coating material from said container and means adapted to adjustably vary the cooperative relation of the parts consisting of said brush roll mechanism and said applying roll to adjustably vary their engaging pressure and to adjustably vary the cooperative relation of the parts consisting of said applying roll and said container to adjustably vary the extent that said applying roll depends into said container, and means to releasably maintain an adjusted part in its adjusted position.

11. Fruit treating apparatus comprising the combination, with brush roll mechanism and means for feeding fruit thereto, of an applying-roll mounted below said brush roll mechanism and adapted to engage a brush roll of said mechanism, a container for coating material mounted below said applying-roll and brush roll mechanism, said applying-roll being arranged to depend into said container to transfer coating material therefrom to said brush roll mechanism and means adapted to adjustably vary the vertical position of any one of said parts, consisting of said brush roll mechanism, applying-roll and container relative to any other of said parts and to releasably maintain said adjusted part in said adjusted position.

12. An apparatus for treating fruit comprising the combination, with brush roll mechanism providing a fruit runway, of a container for coating material adjustably mounted therebelow, applying-roll means extending into said container and engaging said brush roll mechanism, and means for bodily adjusting said container toward and from said brush roll mechanism, said means comprising two elements relatively movable in roller-bearing contact each with the other, one of said elements presenting an inclined plane and the other relatively movable along said plane, an adjusting screw for causing said relative movements and a ratchet and pawl device arranged to releasably maintain said elements in adjusted positions.

13. Fruit treating apparatus comprising the combination with parallel sloping revoluble brush rolls arranged in pairs cooperating to provide fruit runways, of a supply reservoir arranged below said rolls, and an applier roll revolubly mounted to engage at least one of said brush rolls while extending into said reservoir, said applier roll being adjustable to vary its degree of engagement with said brush roll without moving said reservoir.

14. Fruit treating apparatus comprising the combination with parallel sloping revoluble brush rolls arranged to pairs cooperating to provide fruit runways, of a supply reservoir arranged below said rolls, and a revoluble roll adjustably journaled within said reservoir for adjustable engagement with at least one of said brush rolls.

In testimony whereof I hereunto affix my signature.

ALBERT HAWORTH.